United States Patent [19]
Rodriguez

[11] 4,171,144
[45] Oct. 16, 1979

[54] HOT-TRAY MANIPULATING DEVICE

[76] Inventor: Roberto Rodriguez, 612 Meridian Ave., Alhambra, Calif. 91801

[21] Appl. No.: 857,311

[22] Filed: Dec. 5, 1977

[51] Int. Cl.² .............................................. A47J 45/10
[52] U.S. Cl. ...................................................... 294/30
[58] Field of Search .................... 294/27 R, 27 H, 28, 294/30, 31 R, 32, 16

[56] References Cited

U.S. PATENT DOCUMENTS

| | | | |
|---|---|---|---|
| 1,487,739 | 3/1924 | Harris | 294/30 |
| 1,566,234 | 12/1925 | Seward | 294/30 |
| 1,670,732 | 5/1928 | Montgomery | 294/30 |
| 1,716,780 | 6/1929 | Kennedy et al. | 294/30 |
| 2,410,655 | 11/1946 | Henrichon | 294/30 |
| 3,141,695 | 7/1964 | Furber | 294/30 X |

Primary Examiner—Johnny D. Cherry
Attorney, Agent, or Firm—Boniard I. Brown

[57] ABSTRACT

A device for lifting and manipulating hot trays, principally aluminum foil containers for food products, is constructed with a substantially tubular, insulating handle, and a pair of cranked tines projecting from the forward end of the handle. The separation between the tines, corresponding to the lateral dimension of the tray to be lifted, is adjustable by means of radial slots machined around the periphery of a bezel in the forward end of the handle and by allowing for the radial displacement of one, or both, of the cranked tines in the handle into engagement with a particular slot.

6 Claims, 6 Drawing Figures

U.S. Patent  Oct. 16, 1979  4,171,144
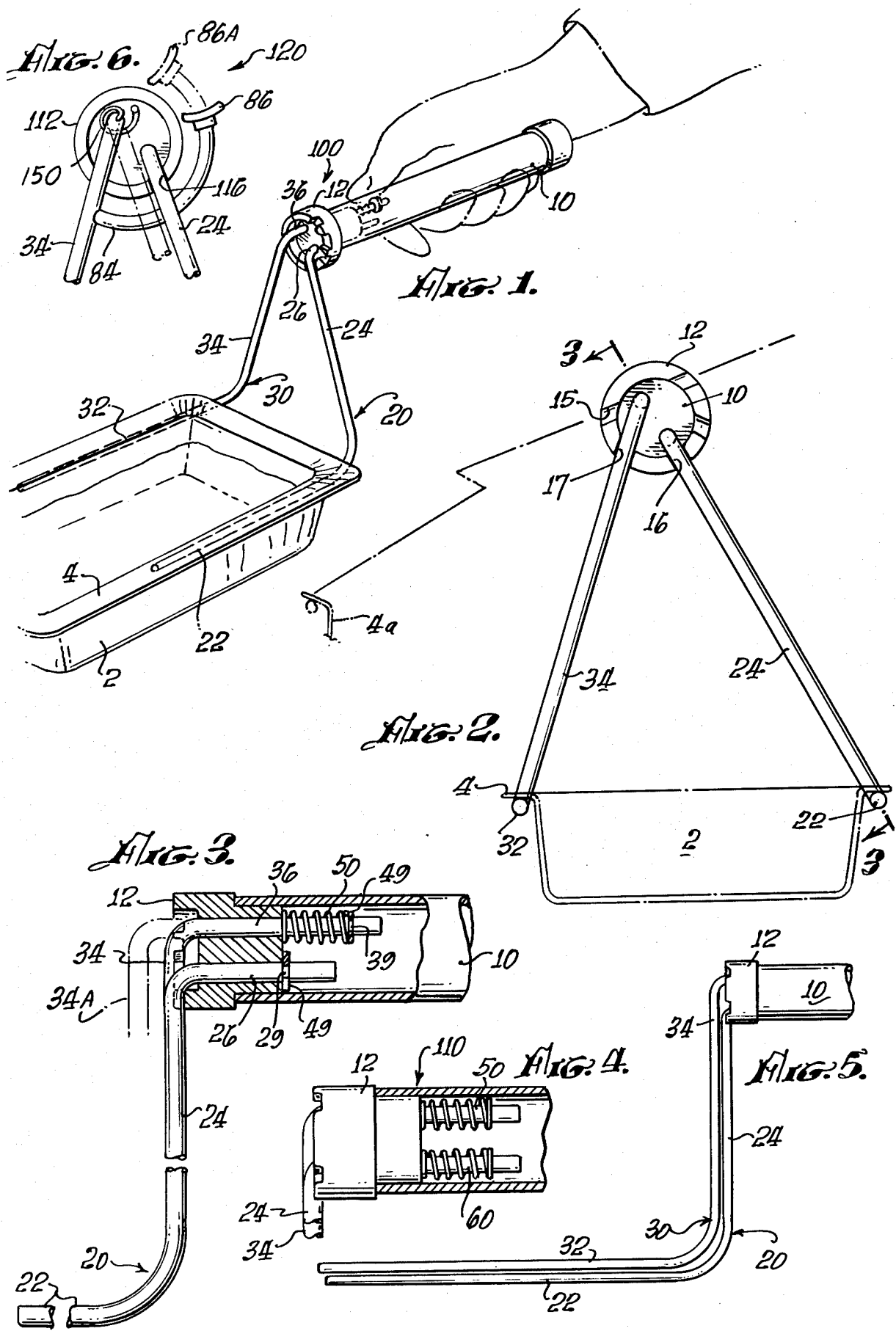

HOT-TRAY MANIPULATING DEVICE

BACKGROUND OF THE INVENTION

Field of Invention

The invention relates to adjustable hot tray lifters; it relates, more particularly, to hot tray lifters with a pair of parallel tines, of which one may be rotated about a bearing in the insulated handle of the lifter, thereby adjusting the lateral spacing between the tongs.

The requirement for hot tray lifters arises from the need of handling trays containing heated substances, principally food items, in which the manual contact with the tray proper is made difficult due to its elevated temperature. Hot tray lifters of the prior art, such as U.S. patents to Demetreon, U.S. Pat. No. 227,029, Brix, U.S. Pat. No. 1,505,319, Ray, U.S. Pat. No. 872,683, Lee, U.S. Pat. No. 1,238,531, and Hagen, U.S. Pat. No. 1,505,258, are representative. were highly concerned with the handling of pie pans and other rigid baking dishes. More recently, a new field has been opened by the appearance and wide-spread distribution of heating containers for frozen food products, generally made from stamped aluminum foil.

Such foil containers are excellent for storage and, due to their high heat transfer capacity, permit the uniform and rapid heating of the foods contained therein, but are structurally weak. In general, such containers cannot support the weight of the foods placed on them in a cantilevered manner, with respect to their support points. This poses no difficulty as long as the container rests on a heating surface, such as a baking grille providing a substantially uniform support, or on a serving tray; however, the transition from the preparing station to the serving station does present substantial problems. Generally such containers are handled by insulated gloves, which makes difficult the uniform support, especially if the container is of any substantial size, as may be the case with 'TV Dinners' and other food preparations.

It is, therefore, a primary object of the invention to provide hot tray lifters which are capable of supporting the peripheral flanges of hot trays in a uniform manner.

It is an additional object of the invention to provide such hot tray lifters with lifting tines readily adjusted to hot trays of different sizes and configurations.

It is a further object of the invention to provide hot tray lifting and handling devices which permit the manipulation of such items by the unprotected hand, through the provision of an insulated handle in which the aforementioned tines are supported.

It is yet another object of the invention to provide hot tray lifting devices which are easily stored, readily adjusted to accommodate a given tray size, easily cleaned and sterilized for use in food service, by unskilled personnel with the materials and facilities available in the average kitchen.

It is a further object of the invention to teach the construction of such hot tray lifting devices in a manner compatible with economic manufacture and distribution.

SUMMARY OF THE INVENTION

The above objects and other objects and advantages which shall become apparent through the detailed description of the preferred embodiment of the invention, below are attained in a hot-tray lifting device comprising a substantially tubular handle and a pair of tines of substantially Z shape. One end of each tine is inset into the handle in alignments parallel to the centerline thereof; the intermediate portion of each tine is directed radially outwardly of the end portion of the handle; while the other end portions extend forward of the handle, and substantially parallel thereto.

At least one of the aforementioned tines is inset into a bearing, allowing for radial displacement with respect to the other, so that the distance between the outboard portions of the tines may be varied at will. This distance may be reduced to a minimal value for storage purposes; it may also be extended until the radiating segments of the tines are in opposition and the distance between the tine outboard ends is defined by the sum of the lengths of the intermediate portions.

For use in lifting and moving hot trays, the distance between the tines is set to correspond to the width of the tray below its upper flanges. The radially adjustable tine, or tines, is then fixed in position and the device inserted, tines forward, under the lateral flanges of the hot tray. The tray may then be lifted and maneuvered by corresponding movements of the handle portion, which is firmly gripped by the user's hand.

Since the tray is uniformly supported along the lateral edges at the root of the flanges, the load of the food contained in the tray is readily transmitted to the tines of the lifting device, without overloading the material of the tray itself.

BRIEF DESCRIPTION OF THE DRAWINGS

The preferred embodiment of the invention is described in detail below, with reference to the accompanying drawing which:

FIG. 1 is a perspective view of a hot-tray lifting device of the invention in use, supporting a tray, and held in the right hand of a user;

FIG. 2 is a frontal view of the embodiment of FIG. 1 also indicating, in partial detail, the manner of adjustment to trays of differing sizes;

FIG. 3 is a partial transverse section through the previously illustrated embodiment, taken along section line 3—3 in FIG. 2, illustrating the manner of locating the inboard ends of the tines in the handle assembly;

FIG. 4 is a partial transverse section, similar to that of FIG. 3, illustrating another embodiment of the invention with two adjustable tines;

FIG. 5 is a partial side view of a hot-tray lifting device of the invention, in the storage, or inactive, state; and FIG. 6 is a partial frontal view, analogous to FIG. 2, showing yet another embodiment, wherein the adjustable tine is actuated by a thumb-latch operated by the user, and biased towards the fixed tine by a bias spring housed within the handle.

DESCRIPTION OF THE PREFERRED EMBODIMENT

The perspective view of FIG. 1 shows a hot-tray lifting and handling device 100 of the invention, supporting a tray 2 on its parallel tines 20 and 30. The tines 20 and 30 each comprise a forward segment 22 and 32, respectively, central cranked segments 24 and 34, and socketed segments 26 and 36.

Basically the central cranked segments of the two tines are at right angles to the forward and socketed segments which, in turn are parallel to one another and laterally spaced by the lengths of the respective cranked segments 24 and 34. The socketed segments of the tines are supported within the substantially tubular body of a handle 10, adapted to be gripped by the hand of a user and, in the preferred construction of the invention, made of an insulating material. The radial location of the tines with respect to the handle 10 are fixed by slots machined into the periphery of a bezel 12, surrounding the forward end of the handle 10.

The hot-tray is provided with a peripheral flange 4, the basal surface of which rests upon the forward tine segments 22 and 32 and which serves as the load transmission path for the contents of the tray into the lifting device 100.

The hot-tray lifting device 100 is shown in a frontal aspect in FIG. 2, along with the tray 2 supported thereon. This view clearly illustrates the manner in which the tines are inserted into appropriate sockets within the handle 10 and their retention in slots, as typified by a slot 15 for the cranked tine portion 34, radiating from these sockets. The slot 15, and the other other slots radiating from the sockets of tines 20 and 30, are milled into the peripheral edge of the bezel 12, as described above.

In the embodiment of FIG. 2, the tine 20 is fixed in radial alignment with respect to the handle 10, in that its socketing is so arranged that the cranked portion 24 of the tine cannot be moved out of engagement with a slot 16 in the bezel 12. The other tine 30 is, on the other hand, so socketed that it may be reciprocated out of engagement with a particular slot, such as slot 17 in which it is nested in the view of FIG. 2, and rotated into engagement with another slot, such as the slot 15. This mobility of the tine 30 between alternate slots serves as a means of adjustment for the gap between the parallel tine segments 22 and 32, and, consequently, adapts the device 100 to differing widths of hot trays to be handled.

The operation of the position adjusting mechanism is illustrated in FIG. 3, a partial transverse section taken along section line line 3—3 in FIG. 2. The root segment 26 of the tine 20 is shown socketed in a bearing orifice passing through the bezel 12 and parallel to the axis of the handle 10; the cranked segment 24 of this tine is retained in slot 16 in a region immediately adjacent to the bend interconnection with the root segment 26, while the latter is prevented from reciprocating in its locating bearing orifice by a circlip 49 engaged in a groove 29, immediately adjacent to the inboard face of the bezel piece 12.

The root segment 36 of the tine 30 passes through an orifice in the bezel 12 which is similar to, and parallel with, the socketing orifice associated with the segment 26. Since the tine 30 must reciprocate in the bezel 12, to permit the angular adjustments discussed above, the circlip 49 on the inboard portion of its root segment 36 is located in circumferential groove 39 spaced from the inboard face of the bezel. The intervening length of the tine root is surrounded by a bias compression spring 50, whose function is the retention of the cranked tine portion 34 in a chosen slot in the bezel 12. The user may, however, grasp the tine 30 and pull it outward from the bezel 12, compressing the bias spring 50 in the process, and rotate it in the bezel until the cranked segment 34 is aligned with the desired slot; upon release the tine will snap back toward the bezel and be securely located in the selected slot. The position of the tine 30 during the adjustment process is illustrated by the dashed outline of its cranked segment, indexed at 34A, in FIG. 3.

A modified embodiment of the invention is shown in in the fragmentary sectional view of FIG. 4, which corresponds in function to the partial view of FIG. 3. The modified embodiment 110 is provided with tines 20 and 30 both of which are adjustable in terms of radial alignment, an end achieved by the installation of a bias spring 60 on the root portion 26 of the tine 20, in all respects identical to the spring associated with the tine 30.

The modified embodiment 110 is preferred in uses where the items to be handled, the cognates of the hot tray 2 of FIG. 1, are unpredictable in size, and the additional facility for adjusting the lateral distance between the parallel outboard ends of the tines 20 and 30 is an advantage.

The fragmentary side view of FIG. 5 is applicable to either the device 100 or the modified hot tray lifter 110; it shows the device of the invention in the stored condition, with the tines 20 and 30 brought into adjacent alignments. This position of the tines permits the laying of the device in a drawer, or storage along a wall by hanging, without the separation of the tines, a necessary feature of the device in the use condition, interfering with other utensils in the same area.

The partial, frontal view of FIG. 6 is a close analogue of FIG. 2 and shows yet another variant device 120 adapted to ready adjustment to hot trays of differing dimensions. In the embodiment 120 the tine 20 is fixed in relative position in a bezel 112, by engagement with a slot 116. The root portion 36 of the tine 30 is also secured in an orifice in the bezel 112, similarly to the embodiment of FIG. 3, save that the orifice is laterally offset with respect to the socket of the tine 20, so that the two tines may be rotated into adjacent, parallel alignments, without one interfering with the other. The cranked portion 34 of the tine 30 is biased into such a parallel alignment adjacent to the cranked portion 24 of the tine 20 by means of a bias spring 150, not visible in the illustration, which is basically torsional in nature, rather than compressive as the bias spring 50 incorporated into the embodiment 100. The spring 150 impels the tine 30 toward the tine 20 at all times, the rotational movement of the cranked portion 34 being unimpeded by any additional slots in the periphery of the bezel 112.

The user controls the opening of the gap between the two tines by means of thumb-latch 86 attached to the free end of a pushrod 84, curved into a circular arc, whose other end is firmly affixed to the tine 30. Depression of the latch by the thumb of the user, whose right hand is gripping the handle 10 of the device, results in the separation of the forward segments 22 and 32 of the tines; when the gap is greater than the width of the tray to be gripped, the tines are inserted below the flanges of the tray and the pressure on the thumb-latch relaxed until the bias spring 150 brings the tine 30 towards the tine 20. The tray to be handled is gripped by a gentle pressure exerted by the bias spring and, upon a lifting motion of the handle 10, the tine segments 22 and 32 are raised to bear on the undersides of the flanges of the tray.

Release of the tray from the grip of the device 120 is accomplished by reversing the above process; the thumb-latch 86 is depressed, the device is withdrawn axially from around the tray, and the latch is released again, so that the two tines automatically come against each other into a storage position equivalent to that shown in FIG. 5.

The device of the invention has been described above with reference to its preferred embodiment and two minor modifications thereof. Other changes and modifications may occur to one skilled in the art upon exposure to the teachings herein; such changes are deemed to be encompassed by the invention, which is delimited solely by the appended claims. Such changes may refer to the constructional details and materials, such as the shape of the tines which, in the described embodiments, are shown as constructed from bent metallic wire; the manner of constructing the handle and the bezel portion inset into the handle; the manner of providing the locating slots in the bezel by milling and/or mold forming; the manner of installation, anchoring and forming the bias springs associated with the adjustable tine or tines; as well as other constructional details. Furthermore, it shall be understood that the device of the invention may be put to cognate uses and is not restricted to employment with heated food trays and that modifications in the shape and gripping surfaces of the tines to adapt the device to such alternate uses shall be comprehended in the invention.

The Inventor claims:

1. A hot tray manipulating device, comprising:
   handle means,
   a pair of lifting tines, each of said tines comprising a root segment, a cranked portion substantially orthogonal to said root segment, and a forward segment substantially parallel to said root segments,
   socket means for retaining said root segments of said pair of tines rotatably mounted in said handle means with said segments in parallel relation and said cranked portions in angularly displaced relation, and
   adjusting means comprising plural retaining means on the handle means for selective engagement with the tines to provide selected angular displacement between said tines.

2. The device of claim 1, wherein:
   said adjusting means include at least two slots in the peripheral portion of said handle means, said slots radiating from a socket means orifice in which one of said tines is rotatably mounted and adapted for retaining the tine against relative angular movement.

3. The device of claim 2, additionally comprising bias spring means in said handle means for urging the root segment of said one of said pair of tines into engagement with a preselected one of said slots.

4. The device of claim 3, additionally comprising:
   at least two other slots in the peripheral portion of said handle means, said slots radiating from a socket means orifice wherein the other of said tines is retained; and
   a bias spring in said handle for urging the root segment of said other tine into engagement with a pre-selected one of said other slots.

5. The device of claim 1, wherein said adjusting means include a bearing orifice in said socket means for the rotationally free retention therein of one of said pair of tines, and torsional bias spring means for urging said one tine into proximity with the other tine.

6. The device of claim 5, wherein said adjusting means additionally include lever means for manually displacing said one tine relative to the other tine against the urging of said torsional bias spring means.

* * * * *